United States Patent
Riedel et al.

(10) Patent No.: US 10,956,801 B2
(45) Date of Patent: Mar. 23, 2021

(54) METHOD FOR PROVIDING A READER WITH A TAMPER LOOP STATUS OF A RADIO-FREQUENCY TRANSPONDER

(71) Applicant: EM Microelectronic-Marin S.A., Marin (CH)

(72) Inventors: Juergen Riedel, La Neuveville (CH); Paul Muller, Crissier (CH); Goran Stojanovic, Neuchatel (CH); Jan Bicak, Milovice (CZ)

(73) Assignee: EM Microelectronic-Marin S.A., Marin (CH)

( * ) Notice: Subject to any disclaimer, the term of this patent is extended or adjusted under 35 U.S.C. 154(b) by 619 days.

(21) Appl. No.: 15/800,844

(22) Filed: Nov. 1, 2017

(65) Prior Publication Data

US 2018/0129926 A1 May 10, 2018

(30) Foreign Application Priority Data

Nov. 4, 2016 (EP) .................................... 16197408

(51) Int. Cl.
*G06K 19/073* (2006.01)
*G06K 19/07* (2006.01)
*G06K 19/02* (2006.01)
*G06K 19/077* (2006.01)
*G08B 13/24* (2006.01)

(52) U.S. Cl.
CPC ..... *G06K 19/07372* (2013.01); *G06K 19/027* (2013.01); *G06K 19/0716* (2013.01); *G06K 19/0723* (2013.01); *G06K 19/07798* (2013.01); *G08B 13/2417* (2013.01); *G08B 13/2431* (2013.01)

(58) Field of Classification Search
CPC ......... G06K 19/07372; G06K 19/0716; G06K 19/0723; G06K 19/027; G06K 19/07798; G06K 7/10257; G06K 7/10297; G08B 13/2417; G08B 13/2431
USPC ........................................................... 342/44
See application file for complete search history.

(56) References Cited

U.S. PATENT DOCUMENTS

| | | | | |
|---|---|---|---|---|
| 2010/0144269 A1* | 6/2010 | Do | ..................... | G06K 19/0715 455/41.1 |
| 2013/0135104 A1* | 5/2013 | Nikkanen | ........ | G06K 19/07372 340/572.1 |
| 2014/0263659 A1* | 9/2014 | Kervinen | ............. | G06K 19/027 235/488 |

OTHER PUBLICATIONS

European Search Report dated Apr. 4, 2017 in European Application 16197408.4, filed on Nov. 4, 2016.

* cited by examiner

*Primary Examiner* — Bo Fan
(74) *Attorney, Agent, or Firm* — Oblon, McClelland, Maier & Neustadt, L.L.P.

(57) ABSTRACT

A method provides a tamper loop status of a radio-frequency transponder to a reader. The transponder communicates with the reader at a first frequency according to a first communication protocol. The transponder includes a first non-volatile memory for storing a first set of data of the first communication protocol. The first memory includes a user memory having two portions and each portion includes a data item specific to a status of the tamper loop. The method is performed by the transponder after receiving a request according to the first protocol to read the user memory and includes generating a logical view of the user memory, the logical view including only one of the two portions that is selected according to a value of a binary parameter representative of a status of the tamper loop. The method also includes providing the logical view to the reader via the first protocol.

13 Claims, 5 Drawing Sheets

FIG. 1

| SWAP | TWEN | TA(TPOL=0) | TA(TPOL=1) | VIEW |
|---|---|---|---|---|
| X | 0 | X | X | Physical view |
| 0 | 1 | X | X | Physical view |
| 1 | 1 | 0 | 1 | 1st logical view |
| 1 | 1 | 1 | 0 | 2nd logical view |

METHOD FOR PROVIDING A READER WITH A TAMPER LOOP STATUS OF A RADIO-FREQUENCY TRANSPONDER

This application claims priority from European patent application No. 16197408.4 filed on Nov. 4, 2016, the entire disclosure of which is hereby incorporated herein by reference.

FIELD OF THE INVENTION

The invention relates generally to the field of radio-frequency identification (RFID) transponders, and in particular to RFID transponders of passive type that comprise a tamper loop functionality. The present invention relates particularly to a method for providing a reader with the tamper loop status of a RFID transponder of passive type that comprises a tamper loop functionality.

In radio frequency identification, the term transponder refers to a device configured to emit an identifying signal in response to an interrogating received signal. A RFID transponder does not necessarily have an internal power supply or battery of its own, in this case the power required to energize the transponder is obtained from an electromagnetic field generated by a reader, also known as interrogator, used to interrogate the transponder. Such a transponder relies purely on backscatter communication. The term passive refers to transponders of this type.

BACKGROUND OF THE INVENTION

RFID transponders may be used in various situations where identification is needed. RFID transponders are classically utilized in consumer products to identify a product among others, and to give information on said product. In addition, RFID transponders may be used to prevent shoplifting and counterfeiting of an original product. In such applications, a RFID transponder may be attached to the product, such as a clothing, a book, an electronic device, etc., in such a way that it cannot be removed without breaking a detection loop of the transponder, generally referred to as tamper loop. One important application area of RFID transponders is the protection of beverage bottles (such as alcohol bottles) or bottles filled with a medical solution. In this case, a transponder may be hidden in the cork of a bottle in such a way that separating the cork from the bottle breaks the tamper loop. Preferably, the design of the tamper loop is such that reconstructing it when it is broken is difficult.

The status of the tamper loop, open/broken or closed/intact is classically provided to a reader or interrogator, for instance a smartphone, by using an application provided by the manufacturer of the product which the transponder is attached to. By way of example, such an application may be based on the near-field communication (NFC) protocol, the status of the tamper loop being embedded in a NDEF message sent, upon interrogation, to the reader. A disadvantage is that this application needs to be regularly updated and maintained in order to follow the latest changes on the server side. Another disadvantage is that different applications might need to be installed on the reader, to check the tamper status of different products.

SUMMARY OF THE INVENTION

It is an object of the invention to overcome this drawback in offering a method for providing a reader with the status of a tamper loop of a RFID transponder to a reader, without using any application.

Thus, the invention concerns a method for providing a tamper loop status of a radio-frequency transponder to a reader, wherein said transponder is configured to communicate with the reader at a first frequency according to a first communication protocol, the transponder comprising a first non-volatile memory for storing a first set of data of the first communication protocol, the first memory comprising a user memory, said user memory comprising two portions, each portion comprising a data item specific to a status of the tamper loop, the method comprising the following steps, performed by the transponder after receiving a request according to the first protocol to read the user memory:

Generating a logical view of the user memory, said logical view comprising only one of the two portions, said portion being selected according to a value of a binary parameter, referred to as the TA parameter, distinct from the data item, said TA parameter being representative of a status of the tamper loop Providing said logical view to the reader via the first protocol.

Furthermore, the method according to the invention may comprise one or a combination of the following characteristics.

According to a not-limited embodiment in which the transponder comprises a second non-volatile memory, the method comprises the following step:

Reading a value of a binary configuration parameter, referred to as the TPOL parameter, in the second memory, the portion being selected according to both the values of the TA and the TPOL parameters.

According to a not-limited embodiment in which the transponder comprises a second non-volatile memory, the method comprises the following step, performed before the step of receiving a request:

Computing the value of the TA parameter, this step comprising:

Reading a previous value of the TA parameter, said previous value being recorded into the second memory Measuring a binary value representative of a current status of the tamper loop Performing a logic function between the previous value of the TA parameter and the measured value, the result of which being the value of the TA parameter.

According to a not-limited embodiment in which the second memory is different from the first memory, the transponder is configured to communicate with the reader at a second frequency according to a second communication protocol, the second frequency being different from the first frequency, the second memory storing a second set of data of the second communication protocol.

According to a not-limited embodiment, the second frequency is an ultra-high frequency.

According to a not-limited embodiment, the second protocol is an electronic product code protocol.

According to a not-limited embodiment, the second memory and the first memory comprise at least a common section.

According to a not-limited embodiment, the method comprises comprising the following step, performed after the step of computing the value of the TA parameter:

Comparing the previous value of the TA parameter recorded into the second memory, and the computed value of the TA parameter In the case where the previous value and the computed value differ, then reading a value of a binary configuration parameter, referred to as the TWEN parameter, in the second memory, said TWEN parameter being representative of whether or not updating the value of the TA parameter in the second memory is authorized In the case where the previous value and the computed value differ, and the read value of the TWEN parameter corresponds to an authorization, then updating the value of the TA parameter in the second memory.

According to a not-limited embodiment, the method comprises the following step:

Reading at least one value informing about the position of the portion in a physical view of the user memory, the logical view being generated by means of said at least one value.

According to a not-limited embodiment, each data item is an URL address.

According to a not-limited embodiment, the first frequency is a high frequency.

According to a not-limited embodiment, the first protocol is a near filed communication protocol.

The invention also relates to a method for providing a view of a user memory of a radio-frequency transponder to a reader, wherein said transponder is configured to communicate with the reader at a first frequency according to a first communication protocol, the transponder comprising a first non-volatile memory for storing a first set of data of the first communication protocol and a second memory, the second memory being shared with the first memory, the first memory comprising a user memory, said user memory comprising two portions, each portion comprising a data item specific to a status of the tamper loop, the method comprising the following steps, performed by the transponder:

Reading:
In the first memory, a value of binary configuration parameter, referred to as the SWAP parameter, said SWAP parameter being representative of whether or not generating a logical view of the user memory is authorized In the second memory, a value of a binary configuration parameter, referred to as the TWEN parameter, said TWEN parameter being representative of whether or not updating a value of a TA parameter in the second memory is authorized, said TA parameter being representative of a status of the tamper loop In a case where the values of the TWEN and the SWAP parameters correspond to an authorization, then performing the method for providing a tamper loop status according to any of the previous claims.

In a case where the value of the TWEN parameter or/and the value of the SWAP parameter does not correspond to an authorization, then providing a physical view of the user memory to the reader.

BRIEF DESCRIPTION OF THE DRAWINGS

The present invention will be described subsequently with reference to the attached drawings, given by way of example, but in no way limited thereto, in which.

DETAILED DESCRIPTION OF THE INVENTION

The invention relates to a method 200 for providing a reader or interrogator with the status of a tamper loop of a passive RFID transponder, said method 200 being part of a method 100 for providing a view of a user memory of such a transponder. In this description, a passive dual-frequency HF-UHF identification transponder is presented, but the transponder may be of another type. The transponder may be a single frequency or a multi-frequency RFID transponder. The transponder may be configured to use a low-frequency, high-frequency and/or an ultra-high frequency band.

Figure 1:
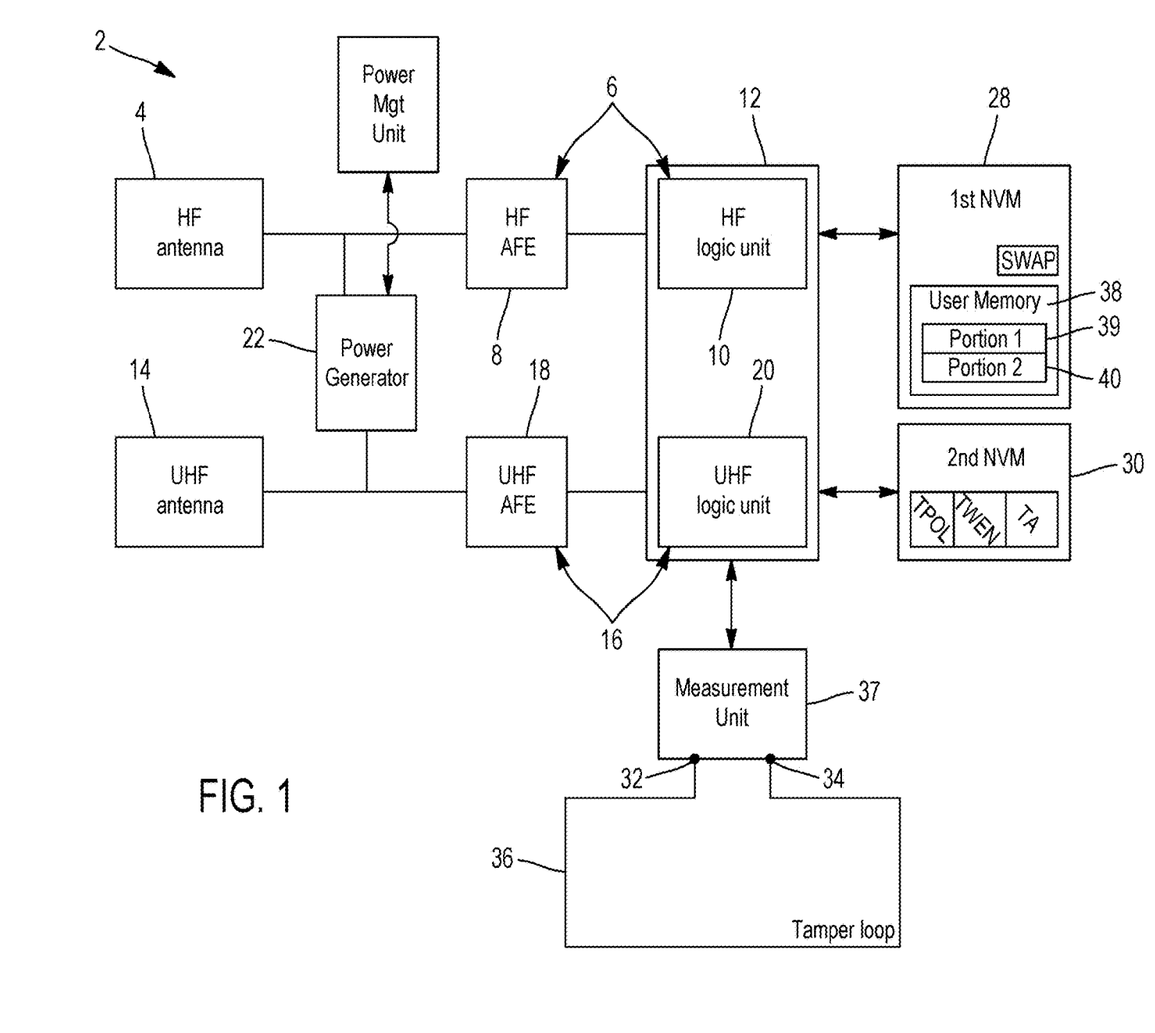
FIG. 1 is a schematic representation of an embodiment of a dual frequency radio-frequency transponder comprising a tamper loop and a user memory, said transponder being used to carry out the methods according to the invention FIGS. 2a, 2b and 2c schematically represent a physical and two logical views of the user memory of the transponder of FIG. 1, according to a first example FIGS. 3a, 3b and 3c schematically represent a physical and two logical views of the user memory of the transponder of FIG. 1, according to a second example

With reference to FIG. 1, the transponder 2 comprises an HF antenna 4 for receiving an HF electromagnetic field, an HF interface 6 formed by an HF analog front end 8 (HF AFE) and an HF logic unit 10 which is part of a global logic circuit 12. The transponder 2 also comprises an UHF antenna 14 for receiving an UHF electromagnetic field, an UHF interface 16 formed by an UHF analog front end 18 (UHF AFE) and an UHF logic unit 20 which is also part of the logic circuit 12. The HF interface is arranged for carrying out an HF protocol and the UHF interface is arranged for carrying out an UHF protocol. In a main embodiment, the UHF protocol is related to the EPC protocol and the HF protocol is related to the NFC protocol, both EPC and NFC protocols being well known from the person skilled in the art.

The transponder 2 further comprises a first non-volatile memory 28, a second non-volatile memory 30, reset means supported by the logic circuit 12, a power generator 22 and a power management unit 24. The first non-volatile memory 28 comprises all configuration data allowing the transponder to carry out the HF protocol, and the second non-volatile memory 30 comprises all configuration data allowing the transponder to carry out the UHF protocol. The logic circuit 12 supports operations common to both interfaces 6, 16 or dedicated to one or the other of these interfaces, as well as general functions in relation to the power management unit 24 and the non-volatile memories 28, 30.

The power generator 22 is arranged so that the passive transponder 2 harvests power from an incoming HF electromagnetic field received by the HF antenna 4 or from an incoming UHF electromagnetic field received by the UHF antenna 14, and provide a power level to the transponder 2. The power management unit 24 is arranged to detect if the available power has reached certain determined power levels, and communicate this information to the logic circuit 12. More precisely, the power management unit 24 is arranged to detect:

A first determined power level provided by the power generator 22 and required for the HF protocol to be carried out by the transponder 2

A second determined power level provided by the power generator 22 and substantially lower than the first determined power, this second determined power level being required for the UHF protocol to be carried out by the transponder 2.

The transponder 2 is further arranged to allow an execution of the HF protocol when the power generated is equal or superior to the first determined power level, and an execution of the UHF protocol when the power generator is equal or superior to the second determined power level.

In addition, the transponder 2 comprises two pads 32, 34 between which a conductive loop 36, referred to as tamper loop, is arranged. The tamper loop 36 may be of any shape. When the tamper loop 36 is intact, that is to say closed, then a short circuit may be detected between the two pads 32, 34. On the contrary, when the tamper loop 36 is broken, that is to say open, then an open circuit is detectable between the two pads 32, 34. For this purpose, the transponder 2 comprises a measurement unit 37 configured to detect the current status (open or closed) of the tamper loop 36. More particularly, the measurement unit 37 is configured to output a binary value Msd_TA representative of the current status of the tamper loop. For instance, the value '0' may arbitrarily refer to the status 'closed' and the value '1' to the status 'open'. Moreover, the measurement unit 37 is configured to provide the value Msd_TA to the logic circuit 12.

Besides that, the second non-volatile memory 30 contains a binary value Prv_TA representative of a previous status of the tamper loop 36. The logic circuit 12 is configured to compute a value of a parameter, referred to as the TA parameter, by using the previous Prv_TA and the current Msd_TA status of the tamper loop 36. More precisely, in a case where the value '0' refers to the status 'closed' and the value '1' refers to the status 'open', then the value of the TA parameter is the result of an OR function between the binary value Msd_TA and the binary value Prv_TA. On the contrary, in a case where the value '0' refers to the status 'open' and the value '1' refers to the status 'closed', then the value of the TA parameter will be inverted. Thus, in both cases, if the current status of the tamper loop is 'open' or/and the previous status of the tamper loop is 'open', then the TA parameter has a value '1'. Of course, it may be decided to associate the value '0' of the TA parameter with a current status of the tamper loop 'open' or/and a previous status of the tamper loop 'open'. In this case, the function OR, respectively the function NAND, should be replaced with a function NOR, respectively a function AND. In any case, the TA parameter is representative of whether or not the tamper loop is currently or was previously broken. Computing the value of the TA parameter instead of directly relying on the value Msd_TA of the current status of the tamper loop is beneficial in cases where the tamper loop was broken and subsequently reconstructed to avoid a tamper detection.

The second non-volatile memory 30 further contains a binary value of a parameter, referred to as the TPOL parameter, representative of the physical signification of the values '0' and '1' of the TA parameter. For instance, it may be decided that if the value of the TPOL parameter is '1', then a closed tamper loop should be indicated with a value '1' for the TA parameter. The value of the TPOL parameter is a configuration value set by the transponder manufacturer. It should be noted that the TPOL parameter is not necessary, since it may alternatively be decided that a closed tamper loop is always indicated with a value '1' for the TA parameter, irrespective of the value of another parameter. However, using the TPOL parameter offers more flexibility regarding the configuration of the transponder.

The second non-volatile memory 30 further contains a binary value of a parameter, referred to as the TWEN parameter, representative of whether or not updating the value of the TA parameter in the second memory 30 is authorized, that is to say representative of whether or not replacing the binary value Prv_TA by the computed value of the TA parameter is authorized, in a case where these two values differ. For instance, it may be decided that a value '1' of the TWEN parameter is representative of an authorization to change the value Prv_TA in the second memory 30. The value of the TWEN parameter is a configuration value set by the transponder manufacturer. It should be noted that setting a value of the TWEN parameter corresponding to an authorization of updating the value of the TA parameter in the second memory 30 is necessary to ensure a proper operation of the tamper detection feature. In addition, the TWEN parameter may also be representative of whether changing the value of the TPOL parameter is authorized. The TWEN parameter is not necessary, since it may alternatively be decided that updating the value of the TA and/or TPOL parameter in the second memory 30 is always authorized. However, using the TWEN parameter offers more flexibility regarding the configuration of the transponder.

Besides that, the first non-volatile memory 30 comprises a user memory 38, which is a memory space that can be used to store user data item such as URLs. The user memory 38 comprises several portions, two of them 39, 40 being used to store two URLs. Each URL is related to a specific status of the tamper loop. For instance, the first URL, stored on the first one of the two portions, may reference a webpage that specifies that the tamper loop is intact (closed), and the second URL, stored on the second of the two portions, may reference a webpage that specifies that the tamper loop is broken (open).

The core concept of the invention is to provide a reader with a logical view of the user memory 38 depending on the status of the tamper loop, providing the transponder 2 is in a suitable mode, referred to as the detection mode, which is detailed later in this description. More precisely, in the detection mode, the first URL only should be visible by a reader interrogating the transponder 2 in a case where the tamper loop 36 is currently intact and was not previously broken (that is to say, the second URL should not be visible). This corresponds to a first logical view of the user memory 38. Likewise, the second URL only should be visible by the reader in a case where the tamper loop 36 is currently broken or/and was previously broken (that is to say, the first URL should not be visible). This corresponds to a second logical view of the user memory 38. It should be noted that when the transponder 2 is not in the aforementioned detection mode, then the physical view of the user memory 38 should be provided.

Figure 2A:
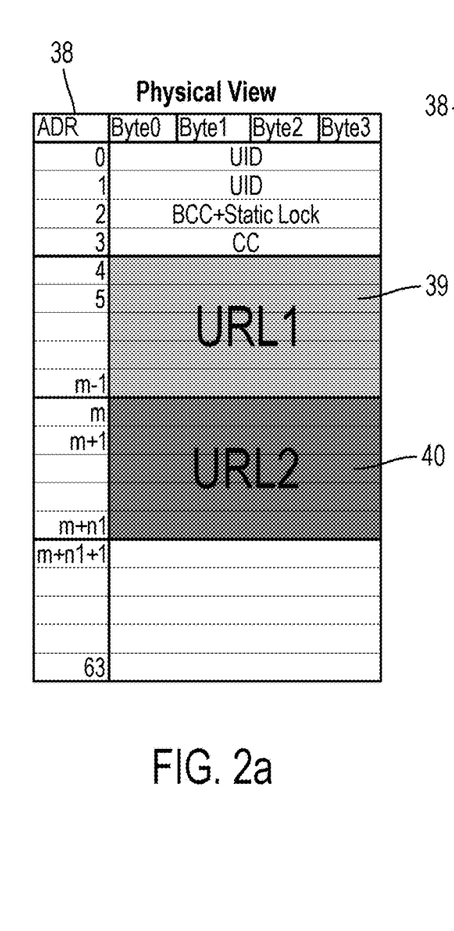
Figure 2B:
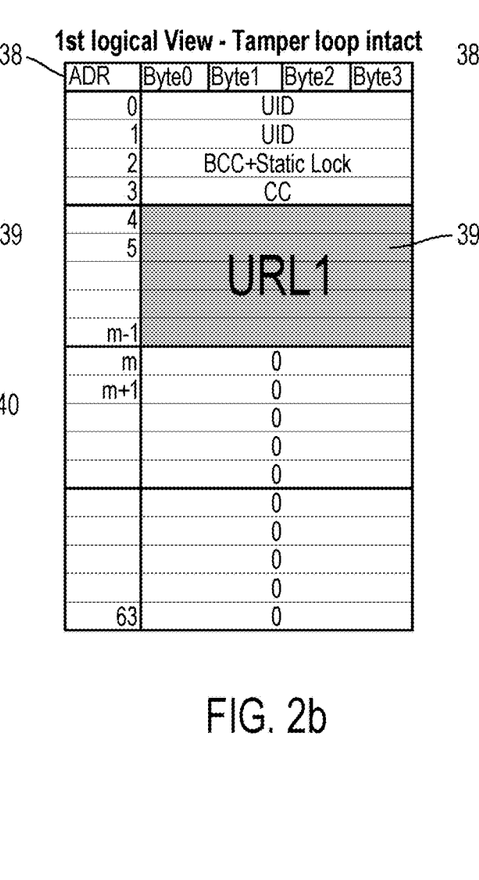
Figure 2C:
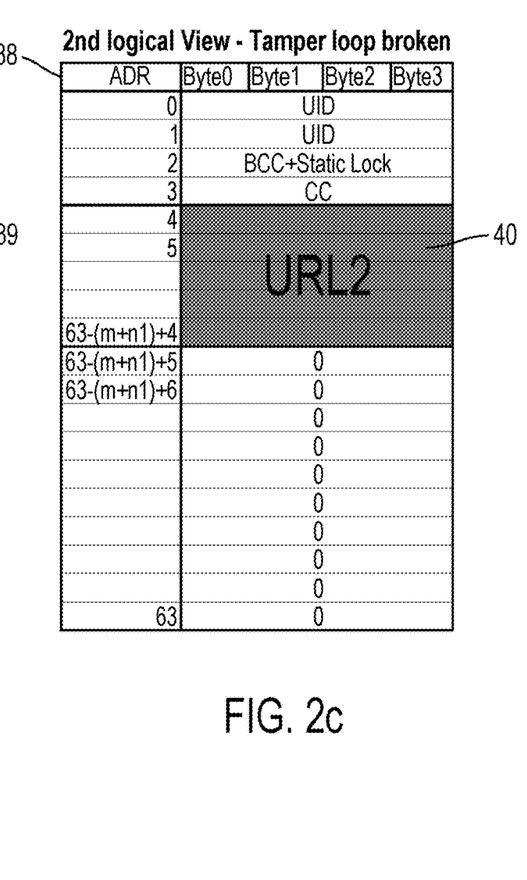

An example of the physical view of the user memory is represented on FIG. 2a. In this example, the user memory is made of 63 blocks, each block comprising 4 bits. The first URL is stored from blocks 4 to m−1, and the second URL is stored in blocks m to m+n. Blocks 4 to m−1 form the first portion 39; blocks m to m+n form the second portion 40. First and second logical views corresponding to the physical view given by way of example in FIG. 2a, are represented on FIGS. 2b and 2c. In the first logical view, the first URL is readable from blocks 4 to m−1, and values '0' are readable from blocks m to 63. The second URL cannot be read anymore. In the second logical view, the second URL is readable from blocks 4 to 63-(m+n)+4, and values '0' are readable from blocks 63-(m+n)+5 to 63. The first URL cannot be read anymore. It should be noted that values m and n give indications about the positions of the portions 39, 40 in the user memory 38. These values are stored in the first or in the second memory 28, 30 so that they can be read and used when a logical view of the user memory 38 needs to be generated.

Figure 3A:
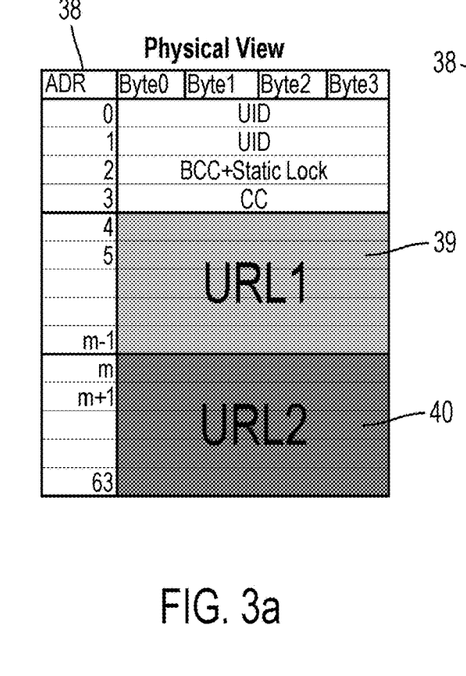
Figure 3B:
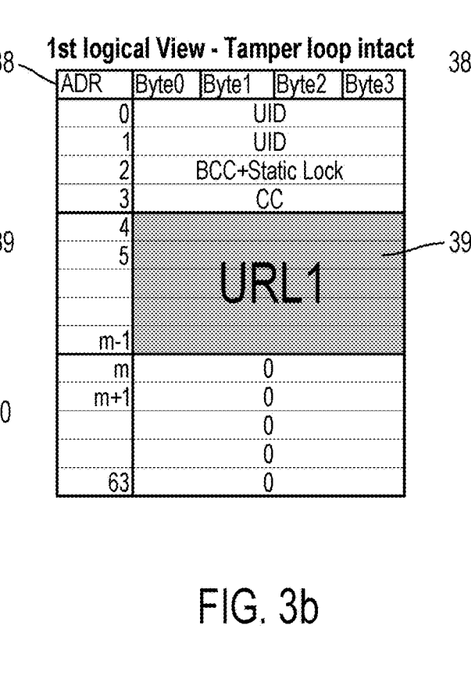
Figure 3C:
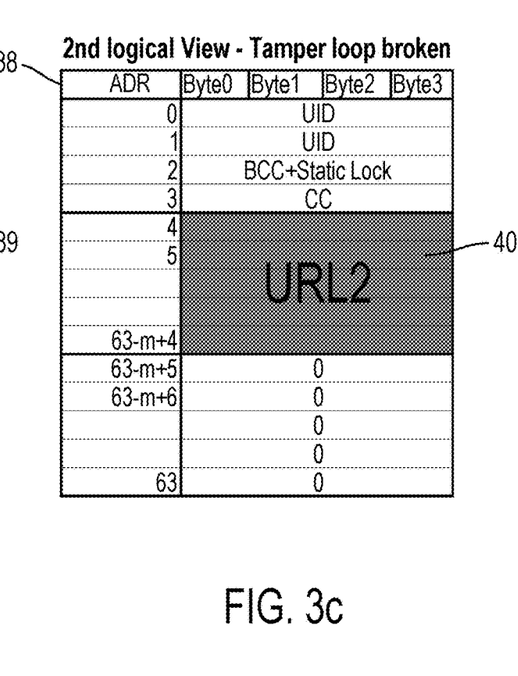

Another example of the physical view of the user memory is represented on FIG. 3a. In this example, the user memory is also made of 63 blocks, each block comprising 4 bits. The first URL is stored from blocks 4 to m−1, and the second URL is stored from blocks m to 63. Blocks 4 to m−1 form the first portion 39; blocks m to 63 form the second portion 40. Storing the URLs in blocks 4 to 63 enables storing longer URLs than in the previous example. First and second logical views corresponding to the physical view given by way of example in FIG. 3a, are represented on FIGS. 3b and 3c. In the first logical view, the first URL is readable from blocks 4 to m−1, and values '0' are readable from blocks m to 63. The second URL cannot be read anymore. In the second logical view, the second URL is readable from blocks 4 to 63-m+4, and values '0' are readable from blocks 63-m+5 to 63. The first URL cannot be read anymore.

The first memory 28 further contains a binary value of a parameter, referred to as the SWAP parameter, representative of whether or not generating a logical view of the user memory 38 is authorized. For instance, it may be decided that a value '1' of the SWAP parameter is representative of an authorization to generate a logical view of the user memory 38. The value of the SWAP parameter is a configuration value set by the transponder manufacturer. It should be noted that the SWAP parameter is not necessary, since it may alternatively be decided that generating a logical view of the user memory 38 is always authorized. However, using the SWAP parameter offers more flexibility regarding the configuration of the transponder 2.

Figure 4:
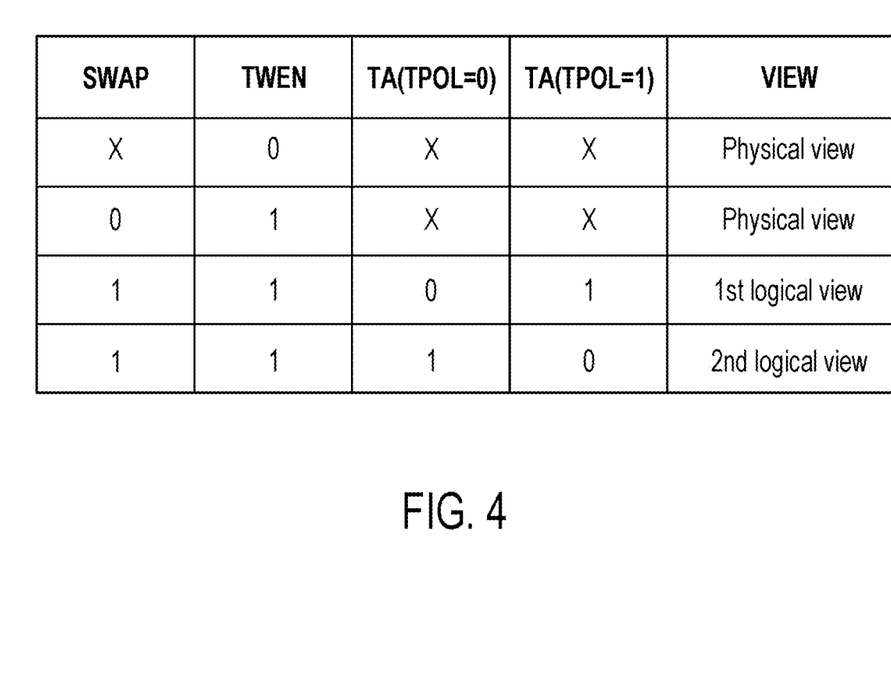
FIG. 4 is a chart showing which view of the user memory is to be selected according to some parameters, said chart being used within the methods according to the invention

FIG. 4 illustrates a chart indicating which one of these views are to be presented to a reader according to the values of the TA, TPOL, TWEN and SWAP parameters. In the configuration embodied by the chart of FIG. 4, a value '1' of the SWAP parameter is representative of an authorization to generate a logical view of the user memory 38, and a value '1' of the TWEN parameter is representative of an authorization to update the value of the TA parameter in the second memory 30. Besides, it should be noted that a cross indicates indifferently a '0' or a '1'. Of course, a different configuration may be decided, this one being presented by way of example only.

When the value of the SWAP and/or the TWEN parameter is '0', then the view of the user memory 38 that is to be presented to the reader is the physical view. However, when the values of the SWAP and the TWEN parameters are both '1', which corresponds to the transponder 2 being in the detection mode, then the view of the user memory 38 that is to be presented to the reader is one of the two logical views. The logical view is selected according to the values of the TA and the TPOL parameters. When the value of the TA parameter is '0' and the value of the 'TPOL' parameter is '0', then the first logical view is to be presented to the reader. When the value of the TA parameter is '1' and the value of the 'TPOL' parameter is '0', then the second logical view is to be presented to the reader. When the value of the TA parameter is '1' and the value of the 'TPOL' parameter is '1', then the first logical view is to be presented to the reader. When the value of the TA parameter is '0' and the value of the 'TPOL' parameter is '1', then the second logical view is to be presented to the reader.

Figure 5:
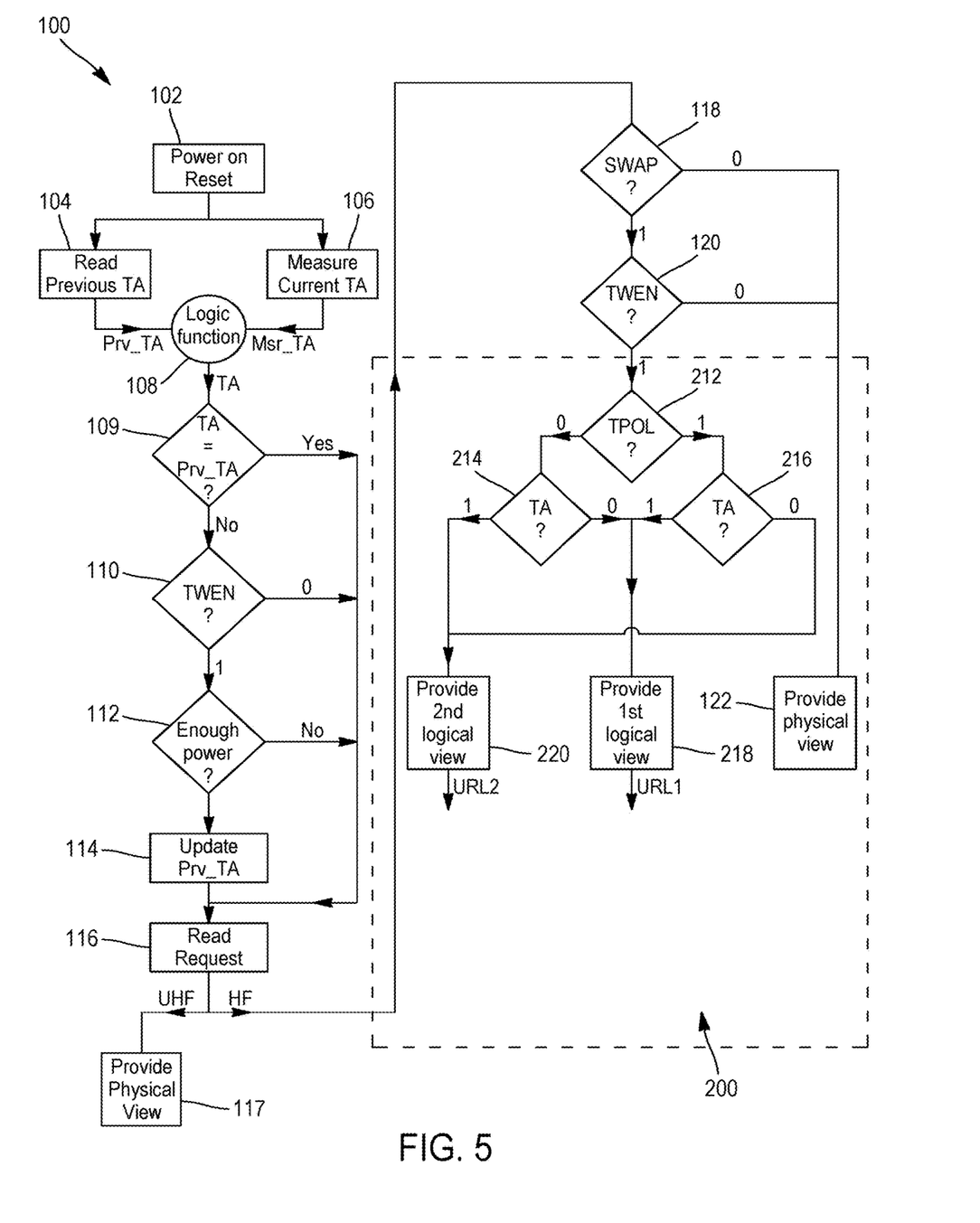
FIG. 5 is a block diagram showing steps of the methods according to an embodiment of the invention.

FIG. 5 is a diagram block showing different steps of the methods 100, 200 according to the invention. The method 100 comprises the following steps, performed by the transponder 2.

In a step 102, as soon as the transponder 2 detects a HF or a UHF electromagnetic field generated by a reader, the reset means performs a power on reset sequence. In particular, the power generator 22 generates a DC voltage until this voltage reaches a level corresponding to the aforementioned first or second determined power level.

In a step 104, the previous value Prv_TA of the TA parameter is read in the second memory 30.

In a step 106, the value Msd_TA representative of the current status of the tamper loop is measured by the measurement unit 37.

In a step 108, a logic function is performed between the previous value Prv_TA of the TA parameter and the value Msd_TA representative of the current status of the tamper loop. As explained before, the logical function may be an OR, AND, NAND or NOR function, depending on the signification of the values '0' and '1' for the TA parameter. The result of this function is the value of the TA parameter.

In a step 109, the computed value of the TA parameter is compared to the previous value Prv_TA of the TA parameter. If these values are equal, then steps 110, 112 and 114 are not performed but step 116 is performed. If these values are different, then step 110 is performed.

In a step 110, the value of the TWEN parameter is read in the second memory 30. If the value of the TWEN parameter is representative of an interdiction to update the value of the TA parameter in the second memory 30, then steps 112 and 114 are not performed but step 116 is performed. If the value of the TWEN parameter is representative of an authorization to update the value of the TA parameter in the second memory 30, then step 112 is performed.

In a step 112, since the transponder 2 is of the passive type, it is checked whether or not the power level available is sufficient to write in the second memory 40. If the power level required to write in the second memory 40 has not been reached, then step 114 is not performed but step 116 is performed. Otherwise, step 114 is performed.

In a step 114, the value of the TA parameter is updated in the second memory (30). In other words, the previous value Prv_TA of the TA parameter is replaced with the computer value of the TA parameter in the second memory 40.

It should be noted that steps 102 to 114 are part of an initialization phase of the transponder 2. When this phase is over, the transponder 2 is ready to communicate with the reader by using the HF or the UHF protocol.

In a step 116, the transponder 2 receives a 'read' request from the reader. If the electromagnetic field applied to the transponder 2 is a UHF field, then, in a step 117, a physical view of the user memory is provided to the reader, and the method 100 ends there. Otherwise, if the electromagnetic field applied to the transponder 2 is a HF field, then step 118 is performed.

In a step 118, the value of the SWAP parameter is read in the first memory 28. If the value of the SWAP parameter is representative of an interdiction to generate a logical view of the user memory 38, then step 122 is performed. If the value of the SWAP parameter is representative of an authorization to generate a logical view of the user memory 38, step 120 is performed.

In a step 120, the value of the TWEN parameter is read in the second memory 30. If the value of the TWEN parameter is representative of an interdiction to update the value of the TA parameter in the second memory 30, then step 122 is performed. If the value of the TWEN parameter is representative of an authorization to update the value of the TA parameter in the second memory 30, then step 212 is performed, said step 212 being the first step of the method 200.

In a step 122, the physical view of the user memory 38 is provided to the reader, and the method 100 ends there.

In a step 212, the value of the TPOL parameter is read in the second memory 30. Subsequently, the value of the TA parameter is also read in the second memory 30. According to the chart presented in FIG. 4 or any other desired configuration, either the first logical view is provided to the reader (step 218), or the second logical view is provided to the reader (step 220). Given a logical view contains only one of the two data items (which are URLs is the described embodiment, but may be of another type of data), the reader can subsequently access the data item corresponding to the status of the tamper loop 36. This way, the reader determines if the tamper loop is currently or was previously broken, or if the tamper loop is still intact. In the case where the data items are two URLs URL1, URL2, then the reader launches a web browser and accesses the webpage corresponding to the suitable URL.

Although the exemplary embodiments have been described in detail with particular reference to certain aspects thereof, it should be understood that the invention is capable of other embodiments and its details are capable of modifications in various obvious respects. As is readily apparent to those skilled in the art, variations and modifications can be effected while remaining within spirit and scope of the invention. Accordingly, the foregoing disclosure, description, and figures are for illustrative purposes only and do not in any way limit the invention, which is defined by the claims. In particular, the transponder could comprise only one memory, in this case all the parameters are stored in said memory.

What is claimed is:

1. A method for providing a tamper loop status of a radio-frequency transponder to a reader, wherein said transponder is configured to communicate with the reader at a first frequency according to a first communication protocol, the transponder including a first non-volatile memory for storing a first set of data of the first communication protocol, the first memory including a user memory, said user memory including two portions, each portion including a data item specific to a status of the tamper loop, the method comprising, after receiving a request according to the first protocol to read the user memory:
   generating, by the transponder, a logical view of the user memory, said logical view including only one portion of the two portions, said one portion being selected according to a value of a binary parameter ("TA parameter"), which is distinct from the data item, said TA parameter being representative of a status of the tamper loop; and
   providing, by the transponder, said logical view to the reader via the first protocol,
   wherein the TA parameter is calculated based on a previous value of the TA parameter.

2. The method according to claim 1, wherein the transponder comprises a second non-volatile memory, the method further comprising:
   reading a value of a binary configuration parameter "(TPOL parameter)" in the second memory,
   the portion being selected according to both the values of the TA and the TPOL parameters.

3. The method according to claim 1, wherein the transponder including a second non-volatile memory, the method further comprising, before the receiving a request:
   computing the value of the TA parameter, the computing comprising:
      reading the previous value of the TA parameter, said previous value being recorded into the second memory,
      measuring a binary value representative of a current status of the tamper loop, and
      performing a logic function between the previous value of the TA parameter and the measured value, the result of which being the value of the TA parameter.

4. The method according to claim 3, wherein the second memory is different from the first memory, and the transponder is configured to communicate with the reader at a second frequency according to a second communication protocol, the second frequency being different from the first frequency, the second memory storing a second set of data of the second communication protocol.

5. The method according to claim 4, wherein the second frequency is an ultra-high frequency.

6. The method according to claim 5, wherein the second protocol is an electronic product code protocol.

7. The method according to claim 3, wherein the second memory and the first memory comprise at least a common section.

8. The method according to claim 3, further comprising, after the step of computing the value of the TA parameter:
   comparing the previous value of the TA parameter recorded into the second memory, and the computed value of the TA parameter;
   reading, when the previous value and the computed value differ, a value of a binary configuration parameter, referred to as the TWEN parameter, in the second memory, said TWEN parameter being representative of whether or not updating the value of the TA parameter in the second memory is authorized; and
   updating, when the previous value and the computed value differ, and the read value of the TWEN parameter corresponds to an authorization, the value of the TA parameter in the second memory.

9. The method according to claim 1, further comprising:
   reading at least one value informing about the position of the portion in a physical view of the user memory,
   the logical view being generated by said at least one value.

10. The method according to claim 1, wherein each data item is an URL address.

11. The method according to claim 1, wherein the first frequency is a high frequency.

12. The method according to claim 11, wherein the first protocol is a near filed communication protocol.

13. A method for providing a view of a user memory of a radio-frequency transponder to a reader, wherein said transponder is configured to communicate with the reader at a first frequency according to a first communication protocol, the transponder comprising a first non-volatile memory for storing a first set of data of the first communication protocol and a second memory, the second memory being shared with the first memory, the first memory comprising a user memory, said user memory comprising two portions, each portion comprising a data item specific to a status of the tamper loop, the method comprising the following steps, performed by the transponder:
   reading, in the first memory, a value of binary configuration parameter, referred to as the SWAP parameter, said SWAP parameter being representative of whether or not generating a logical view of the user memory is authorized;
   reading, in the second memory, a value of a binary configuration parameter, referred to as the TWEN parameter, said TWEN parameter being representative of whether or not updating a value of a TA parameter in the second memory is authorized, said TA parameter being representative of a status of the tamper loop;

performing, when the values of the TWEN and the SWAP parameters correspond to an authorization, a method for providing a tamer loop status of a radio-frequency transponder to a reader, wherein said transponder is configured to communicate with the reader at a first frequency according to a first communication protocol, the transponder including a first non-volatile memory for storing a first set of data of the first communication protocol, the first memory including a user memory, said user memory including two portions, each portion including a data item specific to a status of the tamer loop, the method comprising, after receiving a request according to the first protocol to read the user memory: generating, by the transponder, a logical view of the user memory, said logical view including only one portion of the two portions, said one portion being selected according to a value of a binary parameter ("TA parameter"), which is distinct from the data item, said TA parameter being representative of a status of the tamper loop, and providing, by the transponder, said logical view to the reader via the first protocol; and providing, when the value of the TWEN parameter or/and the value of the SWAP parameter does not correspond to an authorization, a physical view of the user memory to the reader.

* * * * *